United States Patent
Yang

[11] Patent Number: 5,752,987
[45] Date of Patent: May 19, 1998

[54] METHOD FOR PRODUCING IMPROVED ELECTROLYTE-RETENTION BIPOLAR CELLS AND BATTERIES

[75] Inventor: Thomas Yang, Los Altos Hills, Calif.

[73] Assignee: Space Systems/Loral, Inc., Palo Alto, Calif.

[21] Appl. No.: 904,492

[22] Filed: Aug. 1, 1997

[51] Int. Cl.[6] ............................................. H01M 10/38
[52] U.S. Cl. .................................... 29/623.1; 429/210
[58] Field of Search ................................. 429/210, 154, 429/153, 152, 155, 124, 185; 29/623.1

[56] References Cited

U.S. PATENT DOCUMENTS

| | | | |
|---|---|---|---|
| 4,872,957 | 10/1989 | Dong et al. | 205/468 |
| 5,652,073 | 7/1997 | Lenhart et al. | 429/210 |

*Primary Examiner*—M. Nuzzolillo
*Attorney, Agent, or Firm*—Perman & Green, LLP

[57] ABSTRACT

Method for producing an improved rechargeable battery, containing a plurality of stacked, nested bipolar cells, in which each bipolar cell is formed by inserting into a bipolar cup a porous condensed phase positive electrode, a porous dielectric separator, and a gas electrode, adding to the bipolar cell cups a predetermined volume of a liquid electrolyte, and a plurality of the bipolar cell cups are stacked in a nesting relationship within a battery housing pressure vessel. The invention involves the steps of subjecting the stack of bipolar cell cups within the housing to the application of an initial low pressure, up to about 5 psi, to allow the liquid electrolyte to be absorbed by the porous condensed phase positive electrode and by the porous separator, connecting the cells to the battery terminals and closing the pressure vessel, and cycling the battery at a plurality of charge—discharge cycles starting at a low current up to about 20% of normal operational current and gradually increasing to normal ampere—hour charge, to cause the expansion of the porous electrode and separator and full absorption of the liquid electrolyte. Finally, the stack of bipolar cell cups is subjected to the application of a higher pressure, greater than about 20 psi, to seat and seal the cups to each other and compress the stack to a predetermining height within the battery housing without displacing any of the original electrolyte from any of the bipolar cells.

6 Claims, 2 Drawing Sheets

METHOD FOR PRODUCING IMPROVED ELECTROLYTE-RETENTION BIPOLAR CELLS AND BATTERIES

BACKGROUND OF THE INVENTION

1. Field of The Invention

The present invention relates to producing improved bipolar cells and rechargeable batteries, such as nickel hydrogen and zinc oxygen, containing such cells.

2. Discussion of The Prior Art

A requirement of bipolar batteries is the need to contain and retain an adequate volume of an electrolyte within the individual cells to prevent starved or dry electrodes during use. This requirement is complicated in batteries with a gas phase active material since communication between each cell and a common gas storage space must be provided. Thus both a gas vent and a liquid separation are required, with the latter intended to prevent the migration or leakage of the liquid electrolyte from one cell into adjacent cells.

Bipolar cells and rechargeable batteries containing same are disclosed in commonly assigned U.S. Application for Patent, Ser. No. 08/626,992 filed Apr. 3, 1996, titled, "Bipolar Design for a Gas Depolarized Battery" now U.S. Pat. No. 5,652,073. A plurality of cells are suitably mounted within a pressure vessel, specifically within a central cylinder in a nested relationship. Each cell contains a metered predetermined quantity of electrolyte and includes a metallic bipolar cup having a base and an integral upstanding side wall encompassing the base. The upstanding side wall preferably is of truncated conical shape diverging with increased distance from the base, and an insulating material, such as of Teflon®, covers the upstanding side wall.

The cell components for a gas depolarized battery according to the invention comprise a microporous condensed phase positive electrode, a porous separator, a gas electrode and, optionally, a gas screen. The condensed phase positive electrode may, for example, comprise active $Ni(OH_2)$ electrolyte deposited in a microporous nickel electrode (e.g., in a nickel hydrogen battery) or a microporous zinc electrode (e.g., a zinc oxygen battery). The separator is typically a porous insulator such as $ZrO_2$ cloth, asbestos, glass paper, porous plastic, and the like, which acts to electrically insulate the opposing electrodes but allows ionic conduction between the electrodes via the liquid electrolyte solution which fills the pores of the separator.

Each cell is assembled by laying the components up in the metallic bipolar cup in the order discussed. Once the condensed phase positive electrode and dielectric porous separator are in place, sufficient electrolyte is introduced to the cup to fill 100% of the porous volume of the condensed phase positive electrode and separator. The electrolyte for this battery is typically a mixture of KOH and LiOH in water with weight percent between 15% and 45% of KOH and 0% and 20% of LiOH. After electrolyte introduction, assembly is completed by laying the gas electrode and the gas screen, if present, in the metallic cup. Battery assembly consists of repetitively stacking cells to achieve the desired cell count and battery voltage. The stacked cells are placed in the vessel defined by a central cylinder and end caps which together constitute a pressure vessel, compressed under a pressure between about 23 to 25 psi to the design stack height, negative and positive leads from the electrodes are attached to the battery terminals, and the vessel is closed.

Among the problems encountered during the use of such batteries is the development of starved or dry positive electrodes due to the presence of insufficient liquid electrolyte to completely fill the porous electrode when the latter undergoes dimensional expansion during the electrical charge-discharge cycles of use. The additional volume due to expansion should be filled with electrolyte to maintain its electrical performance. Otherwise the starved positive electrodes develop high electrical resistivity which reduces battery performance and life. I have discovered that a portion of the original liquid electrolyte is forced out of each cell into adjacent cells and/or into the housing during assembly at a pressure greater than about 10 psi, such as 23–25 psi, so that inadequate volume remains within each cell to fill the positive electrode when it undergoes dimensional expansion during cycling. Moreover, I have discovered that an additional volume of the remaining liquid electrolyte is forced out of each cell during electrical cycling at a pressure greater than 20 psi, such as 23–25 psi, causing further reduction of the liquid electrolyte.

It is the objective of the present invention to provide a novel assembly method for producing bipolar cell batteries which retain the original volume of added liquid electrolyte within each bipolar cell cup, available to be absorbed by and to fill the porous positive electrode each time that it undergoes dimensional expansion during its charge/discharge cycles, thereby avoiding drying of the positive electrodes, the development of resistivity and reduction in performance and battery life.

SUMMARY OF THE INVENTION

The present invention is based upon the discovery that the liquid-absorbing porosity of the microporous condensed phase positive electrode and of the dielectric porous separator can be used to absorb and shield the liquid electrolyte against displacement under the effects of the elevated assembly pressure of 20 to 25 psi by a novel method comprising (a) placing cells within the battery container comprising the cylinder and end caps, which form a pressure container; (b) compressing the stacked cells to an initial low pressure value up to about 5 psi, to allow the electrolyte to be absorbed by the porous positive electrode and the porous separator; (c) attaching the bus leads from the electrodes to the battery terminals and closing the pressure vessel; (d) subjecting the battery to a plurality of charge—discharge burn—in cycles (such as about 5 to 15) starting from a low ampere—hour charge or current (such as about 20% to 50% of operational current), and gradually increasing to full ampere—hour charge, to cause the expansion of the porous positive electrode and the absorption of the liquid electrolyte; and (e) thereafter subjecting the battery to elevated assembly pressure, generally between about 23 to 25 psi.

DETAILED DESCRIPTION OF THE PREFERRED EMBODIMENT

Figure 1:
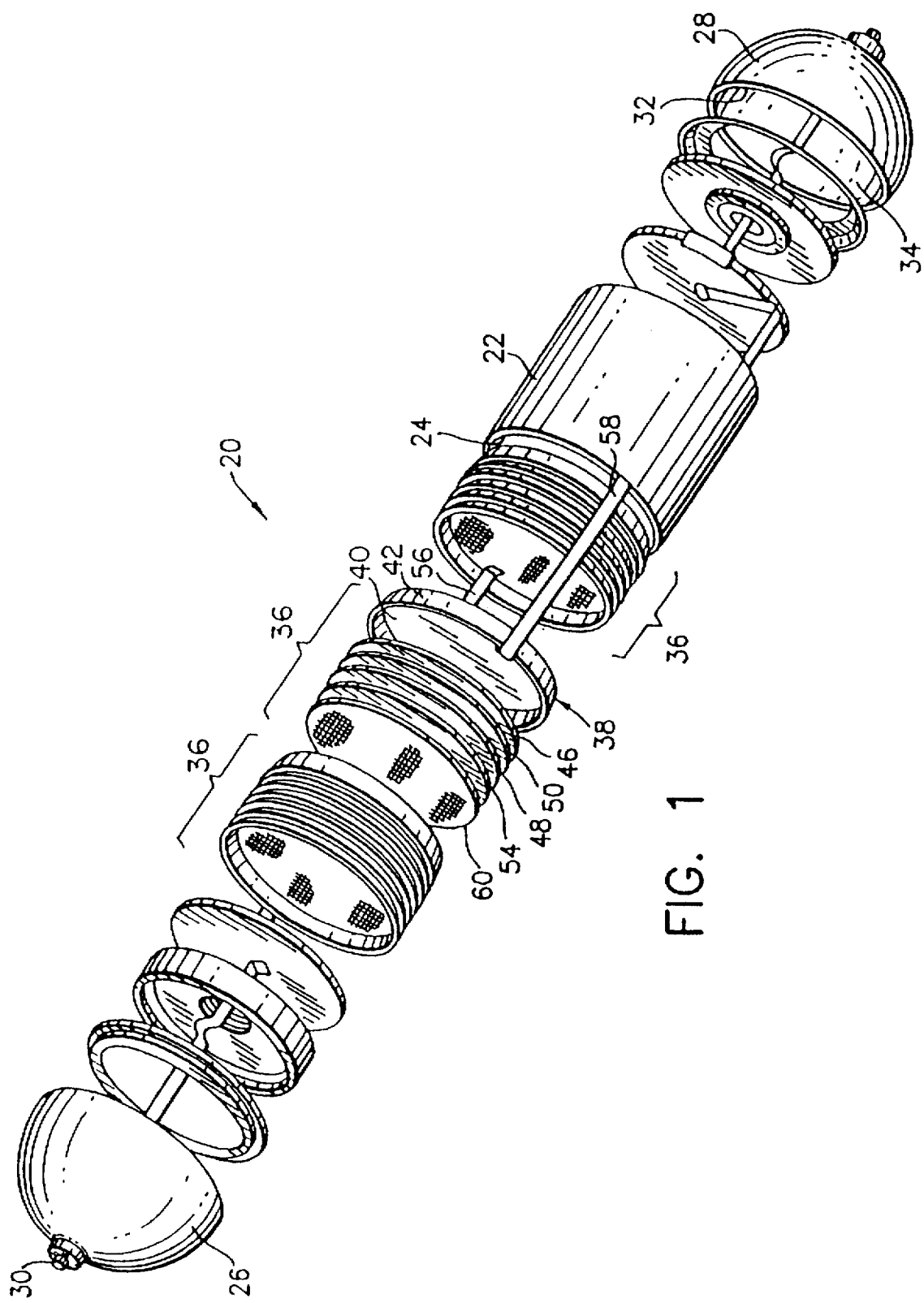
FIG. 1 is a perspective exploded view of a battery embodying the present invention.

FIG. 1 illustrates a bipolar rechargeable battery 20 which may be, for example, of the bipolar nickel hydrogen variety. A vessel for the battery is defined by a central cylinder 22 which may be coated with a Teflon® liner 24, shown in FIG. 2, and opposed, possibly spherical, end caps 26, 28 which may be drawn together into firm engagement with opposed end rims of the central cylinder by means of a suitable fastener. Together, the central cylinder 22 and the end caps 26, 28 provide an inner surface 32 defining an interior region 34 for bulk gas storage as will be described. With this construction, the battery 20 is capable of withstanding such pressures as are generated by the contained gases.

Figure 2:
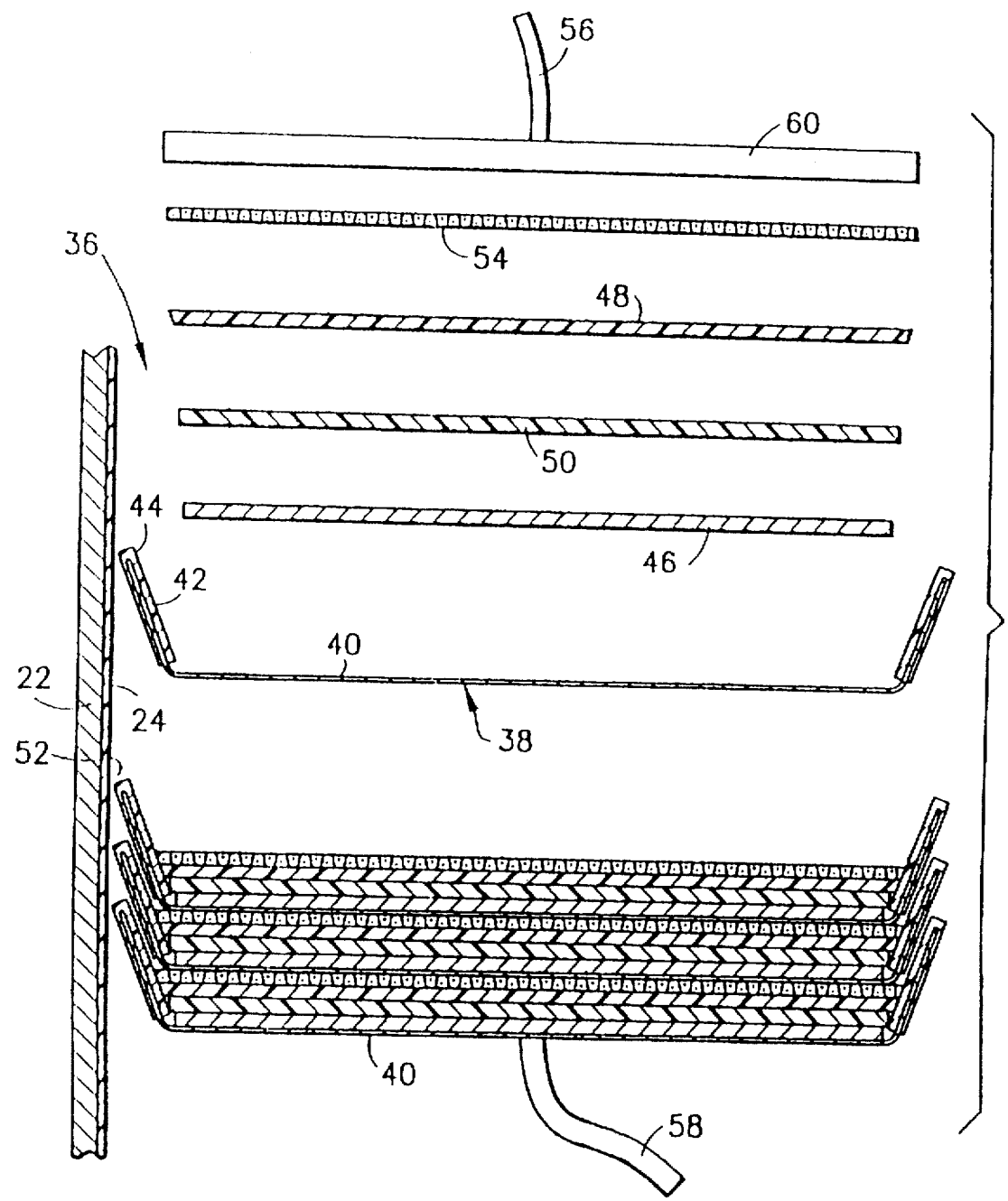
FIG. 2 is a diagrammatic cross section view, partially exploded, illustrating the construction of a plurality of bipolar cells utilized in the battery of FIG. 1.

As shown in FIGS. 1 and 2, a plurality of cells 36 are suitably mounted within the vessel, specifically within the central cylinder 22 in a nested relationship. Each cell 36 contains a metered predetermined quantity of electrolyte and includes a metallic bipolar cup of dish 38 having a base 40 and an integral upstanding upwardly and outwardly tapered side wall 42 encompassing the base. The upstanding side wall is of truncated conical shape diverging with increased distance from the base.

A hydrophobic insulating and sealing coating 44, shown in FIG. 2, covers the interior and exterior surfaces of the tapered wall 42 of each dish 38, including the peripheral rim thereof, so as to insulate the wall 42 of each of the bipolar metallic dishes 38 from each other when the cell 36 including the dishes 38 are nested into contact with each other to form the battery 20. The insulation coating 44, preferably of halogenated olefin polymner, such as Teflon®, is strongly bonded to the metallic tapered walls 42 and remains strongly bonded during an extended lifetime of use under the conditions which exist within the battery 20, namely highly caustic electrolyte (KOH,pH=14+) and electrochemical and thermal stresses.

The metallic bipolar cup 38 may be fabricated from a variety of materials including nickel, aluminum plated with nickel, stainless steel, metallic coated graphite composite and titanium.

A porous condensed phase positive electrode 46 is positioned proximate the base of each cup 38. The condensed phase electrodes used for the purposes of the present invention are typically 84% porous 0.1 cm thick sintered nickel supported on a nickel screen and electrochemically loaded to between 1.0 and 2.5 g/cm$^3$ of void volume with active Ni(OH)$_2$. This is a standard aerospace positive electrode although it is understood that a variety of nickel positive electrodes could be employed. In particular a sintered nickel electrode without a support screen would be preferred as the screen is not needed for current conduction in a bipolar battery.

Overlying the condensed phase electrode 46 and separator 50 is a gas electrode 48 including a condensed current collector for a gaseous active material. The gas electrode is typically platinum powder of platinized carbon powder bonded with Teflon® and supported on carbon cloth or expanded metal. The gas electrode must be conductive through its thickness and, to this end, has no hydrophobic wet proofing porous Teflon® layer. Backside hydrophobicity is still required in order that the electrolyte not flood and block a gas screen 50, to be described. This is achieved by the vendor of the gas electrode 48 using a proprietary hydrophobic carbon coating on the gas side of the electrode. It will be appreciated that the gas electrode 48 is a current collector for a gaseous active material and is sized to fittingly engage the side wall 42 such that any gas generated at the condensed phase electrode 46 must pass through the gas electrode to escape the cell 36 to thereby recombine the generated gas with the active material gas within the cell.

Intermediate the gas electrode 48 and the condensed phase electrode 46 is a porous dielectric separator 50. One form of the separator for purposes of the invention is ZrO$_2$ woven cloth approximately 80% porous and 0.05 cm thick.

However, other suitable materials could be used to achieve a similar result. The separator acts to electrically insulate the opposing electrodes but allows ionic conduction between the electrodes via the liquid electrolyte which fills the pores of the separator.

The upstanding side walls 42 of adjacent cells 36 are oriented such that they mutually define a gap 52, shown in FIG. 2, enabling gas communication between the adjacent cells and between each of the cells and the interior bulk gas region 34 within the battery 20. As previously noted, an insulating liner 24 is provided on the inner surface of the vessel for assuring its fluid integrity.

Rounding out the construction of the cell 36 is an optional gas screen 54 of porous conductive inert material proximate the gas electrode for providing an interface between one cell and an adjoining cell in the battery 20. The gas screen 54 may be any porous conductive inert material such as nickel screen, porous nickel felt, nickel coated plastic screen, and the like. It serves the purpose of allowing shared H$_2$ access to the entire face of the gas electrode and provides electrical conductivity between adjacent cells.

Each cell is assembled by laying the components up in the metallic bipolar cup in the order illustrated in FIGS. 1 and 2. Once the condensed phase electrode 46 and dielectric separator 50 are in place, sufficient electrolyte is introduced to the cup to fill between 60% and 100% of the porous volume of the condensed phase electrode and separator. The electrolyte for this battery is typically a mixture of KOH and LiOH in water with weight percent between 15% and 45% of KOH and 0% and 20% of LiOH. After electrolyte introduction, assembly is completed by laying the gas electrode 48 and gas screen 54 in the metallic cup. Battery assembly consists of repetitively stacking cells in series to achieve the desired cell count and battery voltage. The stacked cells are placed in the vessel defined by the central cylinder 22 and end caps 26, 28 which together constitute a pressure vessel, compressed to a predetermined initial low-pressure value up about 5 psi. This low pressure stabilizes the stacked cells and allows the liquid electrolyte into the porous condensed phase electrode 46 and into the porous separator 50.

Then, the bus leads 56 (negative) and 58 (positive) from the electrodes 60, 40, respectively, are attached to the battery terminals, and the vessel is closed. Next, the battery is subjected to about 10 charge—discharge cycles with a starting cycle at about 20–50% of the full normal charge current and gradually increasing the charge of each cycle to a final cycle at full charge current, to cause the expansion of the full absorption of the liquid electrolyte. Finally, the battery is subjected to elevated assembly pressure above about 20 psi, generally 23 to 25 psi, without any ejection of liquid electrolyte from the cells.

The essential novelty of the present invention relates to the dual pressure assembly method which causes a major volume of the liquid electrolyte applied to each of the cells to be absorbed within the porous electrode 46 and within the porous separator 50 of each cell by the initial application of a low pressure and the subsequent low current cycling. The initial low pressure is preferably up to about 5 psi, most preferably about 3 psi, which low pressure is insufficient to compress the electrode 46 or the separator 50 and exude the electrolyte therefrom or from one cell into adjacent cells.

Subsequently, the stacked cells are subjected to the conventional high assembly pressure greater than about 20 psi, generally between about 23 and 25 psi, to seat and seal the stacked cells within each other and compress the stack to the required height within the battery vessel or housing. As a result of the shielding of the liquid electrolyte within the porous condensed phase electrode 46 and the porous separator 50, little or no liquid electrolyte is present in bulk form within each bipolar cup 38, and substantially no liquid electrolyte is expelled from the cells at the elevated assembly pressure, greater than 20 psi.

The retention of the original volume of liquid electrolyte, such as aqueous KOH, within each cell cup 38 provides an adequate reservoir of the electrolyte to be absorbed within the pores of the condensed phase electrode 46, each time that the electrode 46 undergoes dimensional expansion during the electrical charge-discharge cycle of use. This assures that the porosity of the expanded electrode 46 is always filled with the liquid electrolyte, thereby avoiding starved electrodes, the development of high resistivity within dry areas of the porous electrode, and the gradual degradation of electrical performance of the battery 20.

While the preferred embodiment has been disclosed in detail, it should be understood by those skilled in the art that various other modifications may be made to the illustrated embodiment without departing from the scope of the present invention. Accordingly, the present invention is intended to embrace all such alternatives, modifications and variances which fall within the scope of the appended claims.

I claim:

1. Method for producing a gas depolarized rechargeable battery, containing a plurality of stacked, nested bipolar cells, comprising the steps of:

(a) forming each bipolar cell by inserting into a bipolar cup a porous condensed phase positive electrode, a porous dielectric separator, and a gas electrode;

(b) adding to said bipolar cell cups a predetermined volume of a liquid electrolyte;

(c) stacking a plurality of said bipolar cell cups in a nesting relationship within a battery housing comprising a pressure vessel having battery terminals;

(d) subjecting the stack of bipolar cell cups to the application of a low pressure, up to about 5 psi, to allow the liquid electrolyte to be absorbed by the porous condensed phase positive electrode and by the porous separator;

(e) applying bus leads to the battery terminals and closing the pressure vessel;

(f) subjecting the battery to a plurality of charge—discharge burn—in cycles, starting from a lower than normal ampere—hour charge cycle and gradually increasing the charge with each cycle to a final full ampere—hour charge cycle, to cause the expansion of the porous positive electrode and the absorption of the liquid electrolyte thereby, and (g) subsequently subjecting the stack of bipolar cell cups to the application of a higher pressure, greater than about 20 psi, to seat and seal the cups to each other and compress the stack to a predetermining height.

2. The method of claim 1 in which the pressure in step (d) is up to about 3 psi.

3. The method of claim 1 in which the plurality of cycles is between about 5 and 15.

4. The method of claim 3 in which the plurality of cycles is about 10.

5. The method of claim 1 in which the starting lower than normal charge is about 20% of the normal operational charge.

6. The method of claim 1 in which the pressure in step (g) is 23 to 25 psi.

* * * * *